US010756979B2

(12) United States Patent
Peng et al.

(10) Patent No.: US 10,756,979 B2
(45) Date of Patent: Aug. 25, 2020

(54) PERFORMING CROSS-LAYER ORCHESTRATION OF RESOURCES IN DATA CENTER HAVING MULTI-LAYER ARCHITECTURE

(71) Applicant: EMC Corporation, Hopkinton, MA (US)

(72) Inventors: Layne Lin Peng, Shanghai (CN); Jie Bao, Shanghai (CN); Grissom Tianqing Wang, Shanghai (CN); Vivian Yun Zhang, Shanghai (CN); Roby Qiyan Chen, Shanghai (CN); Feng Golfen Guo, Shanghai (CN); Kay Kai Yan, Shanghai (CN); Yicang Wu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 433 days.

(21) Appl. No.: 14/979,750

(22) Filed: Dec. 28, 2015

(65) Prior Publication Data

US 2016/0197850 A1 Jul. 7, 2016

(30) Foreign Application Priority Data

Jan. 4, 2015 (CN) .......................... 2015 1 0004936

(51) Int. Cl.
*H04L 12/24* (2006.01)
(52) U.S. Cl.
CPC .......... *H04L 41/12* (2013.01); *H04L 41/5003* (2013.01)
(58) Field of Classification Search
CPC ............. H04L 41/00; H04L 41/04–044; H04L 41/08–0823; H04L 41/085–0859;
(Continued)

(56) References Cited

U.S. PATENT DOCUMENTS 7,650,366 B1 * 1/2010 Revsin ................ G06F 11/1435
 711/113
7,739,325 B1 * 6/2010 Okita ...................... H04M 3/51
 709/200
(Continued)

FOREIGN PATENT DOCUMENTS

CN 102546735 A 7/2012
CN 102546735 A 7/2012
(Continued)

OTHER PUBLICATIONS

Unknown, "IaaS, PaaS, SaaS (Explained and Compared)" Oct. 28, 2015, Apprenda.com.*
(Continued)

*Primary Examiner* — Tauqir Hussain
*Assistant Examiner* — Boris D Grijalva Lobos
(74) *Attorney, Agent, or Firm* — BainwoodHuang (57) ABSTRACT

Embodiments of the present invention provide a method and apparatus for performing cross-layer orchestration of resources in a data center having a multi-layer architecture. The method comprises: performing unified control of all resources in all layers of the data center; performing unified storage of all topologies and machine-generated data of all layers of the data center; and orchestrating the resources of the data center based on the unified control and the unified storage. Embodiments of the present invention provide a higher level orchestration than methods in the prior art, and employ some functions provided by methods in the prior art to provide a unified manner when the demand changes for orchestrating a layered cloud data center, in order to immediately provide a suitable capability.

20 Claims, 8 Drawing Sheets

(58) Field of Classification Search
CPC ... H04L 41/0866–0886; H04L 41/0893; H04L 41/50; H04L 41/5035; H04L 41/5038; H04L 43/00; H04L 43/06; H04L 67/00; H04L 67/20; G06F 11/00; G06F 11/30–3065; G06F 11/32–324; G06F 11/327–3452; G06F 15/00; G06F 15/16
See application file for complete search history.

(56) References Cited

U.S. PATENT DOCUMENTS

| | | | | |
|---|---|---|---|---|
| 8,489,676 | B1* | 7/2013 | Chaplin | G06F 16/958 709/203 |
| 8,862,933 | B2* | 10/2014 | Manglik | G06F 9/5072 714/11 |
| 8,936,198 | B1* | 1/2015 | Eddey | G06Q 10/101 235/487 |
| 9,021,297 | B1* | 4/2015 | Hayes | G06F 12/0875 714/6.3 |
| 9,307,019 | B2* | 4/2016 | Manglik | G06F 9/5072 |
| 9,319,274 | B1* | 4/2016 | Wei | H04L 41/0823 |
| 9,449,018 | B1* | 9/2016 | Ma | G06F 9/4881 |
| 9,621,428 | B1* | 4/2017 | Lev | H04L 41/12 |
| 9,652,212 | B2 | 5/2017 | Jayanti Venkata | G06F 8/60 |
| 9,825,822 | B1* | 11/2017 | Holland | H04L 41/50 |
| 10,069,928 | B1* | 9/2018 | Hardy | H04L 67/2833 |
| 2005/0093881 | A1* | 5/2005 | Okita | G06Q 10/06 345/589 |
| 2005/0283348 | A1* | 12/2005 | Tsui | G06F 11/008 703/13 |
| 2007/0255854 | A1* | 11/2007 | Khosravy | H04L 67/1095 709/248 |
| 2008/0059487 | A1* | 3/2008 | Mi | G06F 17/30327 |
| 2011/0078352 | A1* | 3/2011 | Williamson | G06F 11/0748 710/220 |
| 2011/0276962 | A1* | 11/2011 | Chambers | G06F 9/3885 718/1 |
| 2012/0059823 | A1* | 3/2012 | Barber | G06F 16/328 707/737 |
| 2012/0226808 | A1 | 9/2012 | Morgan | |
| 2012/0265871 | A1* | 10/2012 | Dowell | H04L 61/1541 709/224 |
| 2013/0080480 | A1* | 3/2013 | Mao | H04L 41/5009 707/803 |
| 2013/0179991 | A1* | 7/2013 | White | G06F 21/53 726/29 |
| 2013/0205028 | A1* | 8/2013 | Crockett | G06F 9/5027 709/226 |
| 2013/0227641 | A1* | 8/2013 | White | H04L 63/20 726/1 |
| 2013/0339949 | A1* | 12/2013 | Spiers | G06F 9/45558 718/1 |
| 2014/0075031 | A1* | 3/2014 | Doering | H04L 41/5041 709/226 |
| 2014/0075032 | A1* | 3/2014 | Vasudevan | H04L 41/50 709/226 |
| 2014/0130036 | A1* | 5/2014 | Gurikar | G06F 8/61 717/176 |
| 2015/0106827 | A1* | 4/2015 | Fiedel | G06F 9/547 719/330 |
| 2015/0237128 | A1* | 8/2015 | Castro | H04L 67/1095 709/203 |
| 2016/0149766 | A1* | 5/2016 | Borowiec | H04L 67/025 715/735 |
| 2017/0366882 | A1* | 12/2017 | Lingampalli | H04Q 11/0066 |

FOREIGN PATENT DOCUMENTS

| | | |
|---|---|---|
| CN | 102739771 A | 10/2012 |
| CN | 102739771 A | 10/2012 |
| CN | 102750606 A | 10/2012 |
| CN | 103001945 A | 3/2013 |
| CN | 103905543 A | 7/2014 |
| CN | 103955373 A | 7/2014 |

OTHER PUBLICATIONS

Unknown—IaaS, PaaS, SaaS (Explained and Compared)—Apprenda (Year: 2014).*

* cited by examiner

PERFORMING CROSS-LAYER ORCHESTRATION OF RESOURCES IN DATA CENTER HAVING MULTI-LAYER ARCHITECTURE

RELATED APPLICATIONS

This application claims priority from Chinese Patent Application Number CN201510004936.6, filed on Jan. 4, 2015 entitled "METHOD AND APPARATUS FOR PERFORMING CROSS-LAYER ORCHESTRATION OF RESOURCES IN DATA CENTER HAVING MULTI-LAYER ARCHITECTURE" the content and teachings of which is herein incorporated by reference in its entirety.

FIELD OF THE INVENTION

Embodiments of the present disclosure generally relate to a method and apparatus for a data center, and more particularly to a method and apparatus for performing cross-layer orchestration of resources in a data center having a multi-layer architecture.

BACKGROUND OF THE INVENTION

A typical $3^{rd}$ platform data center usually uses cloud technologies and has a multi-layer architecture. Simply put, the $3^{rd}$ platform data center is usually divided into four layers: application layer (Apps layer), Platform as a Service layer, Infrastructure as a Service layer, and a Bare-metal layer.

The topology of real world's cloud data center would be much more complex than above description. However, the hardest thing is each layer being based on and affected by the upper layer or under layer, even cross layers. A general $3^{rd}$ platform application requires: Real timely and elastically response to the request change, including scale-out when the request rapidly increasing, and scale-in at once request storm over; Capabilities requirement change according to the business evolution. For example, a small sales system requires I/O on database; but when the requests number increase, it is necessary to add more load balance layer, cache layer, and more calculation to promote the right products to potential customers, the application turns to CPU intensive type.

Former resource orchestration approaches are not regarding the data center as layered and not considering the resource allocation globally. Most of the former approaches in this area called "Orchestration Engine", but only focus on a sub-part of a data center. In addition, most existing orchestration tools only focus on low-level feature exposing.

Therefore, when the requirement changes, how to orchestrate the layered cloud data center in a unified way in order to provide suitable capabilities immediately is a problem to be solved.

SUMMARY OF THE INVENTION

In view of the above problems existing in the prior art, an object of embodiments of the present invention is to provide a higher level orchestration than methods in the prior art, and employ some functions provided by methods in the prior art to provide a unified manner when the demand changes for orchestrating a layered cloud data center, in order to immediately provide a suitable capability.

A first aspect of the present invention provides a method for performing cross-layer orchestration of resources in a data center having a multi-layer architecture. The method comprises: performing unified control of all resources in all layers of the data center; performing unified storage of all topologies and machine-generated data of all layers of the data center; and orchestrating the resources of the data center based on the unified control and the unified storage.

According to an embodiment of the present invention, performing unified control of all resources in all layers of the data center comprises: forming a single control plane for all layers of the data center.

According to an embodiment of the present invention, performing unified control of all resources in all layers of the data center comprises performing unified control of allocation and reclaim of all resources of all layers.

According to an embodiment of the present invention, the unified storage of all topologies and machine-generated data of all layers of the data center is performed so as to determine full status of all layers of the data center.

According to an embodiment of the present invention, the full status is exposed as a query service and accessible by an external system.

According to an embodiment of the present invention, orchestrating the resources of the data center based on the unified control and the unified storage comprises: in response to requests of one or more layers for resources, performing unified allocation of the resources of the data center based on overall consideration of the data center.

According to an embodiment of the present invention, orchestrating the resources of the data center based on the unified control and the unified storage comprises: finding insufficiency or idleness of resources, and performing unified allocation or reclaim of the resources of the data center based on overall consideration of the data center.

According to an embodiment of the present invention, the unified control for all resources in all layers of the data center and the unified storage for all topologies and machine-generated data of all layers of the data center are implemented through a remote procedure call (RPC) via a message bus.

According to an embodiment of the present invention, the multi-layer architecture at least comprises: a bare-metal layer, an Infrastructure as a Service layer, a Platform as a Service layer or an application layer.

According to an embodiment of the present invention, all resources of all layers at least comprise: hardware resources in the bare-metal layer; virtual machine resources in the Infrastructure as a Service layer; resources in the Platform as a Service layer for developing, running and managing applications; or application resources in the application layer.

According to an embodiment of the present invention, all machine-generated data in all layers of the data center at least comprises: control plane data as static data or metadata of the whole data center, and data plane data gathered from the running system.

According to an embodiment of the present invention, each layer of the multiple layers of the data center exposes its capabilities out through an interface.

According to an embodiment of the present invention, performing unified control of all resources in all layers of the data center comprises: evaluating all resources of all layers of the data center and grouping them into different service level arrangement (SLA) groups.

According to an embodiment of the present invention, evaluating all resources of all layers of the data center and grouping them into different service level arrangement (SLA) groups further comprises: manually defining in a deployment phase, or defining policies according to the data plane data.

According to an embodiment of the present invention, the method is based on task-oriented processes.

According to an embodiment of the present invention, the task-oriented processes at least comprise: an installation process from a bare-metal layer to an operating system, an installation process from the operation system to an Infrastructure as a Service layer, a process of installing and configuring storages, or an installation process from the Infrastructure as a Service layer to the Platform as a Service layer.

According to an embodiment of the present invention, the task-oriented processes can be combined or integrated in a cross-layer manner.

According to an embodiment of the present invention, the method further comprises: storing diversity information of the data center architecture, and managing diversity of the data center architecture.

According to an embodiment of the present invention, a unified user interface is provided for the diverse data center architecture.

According to an embodiment of the present invention, the method is based on a solution design of multiple layers.

According to an embodiment of the present invention, the multiple layers at least comprise: a core logic layer, which is designed to highly abstract detail operations, co-ordinate different third-party orchestration tools, and provide a unified interface from a bare-metal, an Infrastructure as a Service layer, a Platform as a Service layer to an application level; a third-party orchestration tools layer, which is designed to use various third-party orchestration tools, catalog the third-party orchestration tools, and apply a plugin-design to each catalog; and a layer of different processes, which is designed to select and combine the task-oriented processes as a plugin.

A second aspect of the present invention provides an apparatus for performing cross-layer orchestration of resources in a data center having a multi-layer architecture. The apparatus comprises: a control unit configured to perform unified control of all resources in all layers of the data center; a storage unit configured to perform unified storage of all topologies and machine-generated data of all layers of the data center; and an orchestration unit configured to orchestrate the resources of the data center based on the unified control and the unified storage.

A third aspect of the present invention provides a computer program product. The computer program product comprises program codes that cause, when executed on a processor, the processor to execute the method according to the first aspect of the present invention.

In one word, different from the mechanism in methods of the prior art, embodiments of the present invention regard a data center as layered and consider resource allocation globally. Embodiments of the present invention have the following advantages as compared with methods in the prior art: global orchestration, design for the orchestration of all the data center layers, compatibility with various solutions, and declarative resource requests, etc.

BRIEF DESCRIPTION OF DRAWINGS

The above and other objects, features and advantages of embodiments of the present invention will be made readily understood by reading through the following detailed description with reference to the accompanying figures. In the figures, several embodiments of the present invention are illustrated in an exemplary but not restrictive manner, wherein.

DETAILED DESCRIPTION OF PREFERRED EMBODIMENTS

The principles and spirit of the present invention are described below with reference to several exemplary embodiments shown in the figures. It should be appreciated that the description of these embodiments are only intended to enable those skilled in the art to better understand and implement the present invention, not to limit the scope of the present invention in any manner.

A typical $3^{rd}$ platform data center usually uses cloud technologies and has a multi-layer architect Simply put, the $3^{rd}$ platform data center is usually divided into four layers: application layer (Apps layer), Platform as a Service layer, Infrastructure as a Service layer, and a Bare-metal layer. The four layers will be briefly introduced as follows.

The application layer stands for applications deployed by customers for different tasks, e.g., HRIS, eMail, ERP, CRM, BI or real-time analytic applications, as well as some mobile applications backend for third platform. Each application may have multiple instances according to the instantaneous workload, and intelligently scale-out/scale-in capabilities. Different applications require various capabilities to serve. For example, some applications are CPU intensive type, some request heavy I/O, and some require high-security, which need network isolation.

The Platform as a Service layer is a cloud-based computing environment designed for rapid development, running and management of applications. It provides the running environment of programming languages, dependent libraries, data services, and tools for facilitating the customer's application development and deployment. Pivotal Cloud Foundry is one of the most popular "Platform as a Service (PaaS)" systems.

The Infrastructure as a Service layer is a provision model in which an organization outsources the equipment used to support operations, including servers, networks components and storages. In most case of the cloud data center, Infrastructure as a Service (IaaS) usually based on some virtualization technology, and provides the capabilities to PaaS. A common integration way of IaaS and PaaS, is installed PaaS on the resources provided by IaaS: the components of PaaS installed onto the virtual machines created by IaaS; the storage used to persistent data services or application golden images are the block or file storage from IaaS; the components of PaaS, or even the application communication each other with the virtual network created by IaaS, to make sure isolation. In this model, the PaaS benefits from the advantages of IaaS, such as elastic, high available, migration convenience and more. Quality of Service (QoS) is one of the key features of an IaaS to abstract diversity capabilities of under layers, and crux of numerous and heterogeneous strategies to VM placement and cloud federation.

The bare-metal layer generally refers to the hardware infrastructures. Since the present disclosure focuses on the cloud environment, a lot of details of hardware infrastructures are omitted and generalized them as bare-metal layer to make the data center architect easy to understand. In fact, it includes: CPUs, memories provides by server clusters; Layer1-Layer7 network protocols and network components; storage area networking (SAN) storage, server embed-storage, and more, which we can clarify from model 1 to model 4, as well as various file systems. All these hardware provides different service level agreement (SLA) capabilities. A qualified IaaS will abstract these differentials to QoS.

The topology of real world's cloud data center would be much more complex than above description. However, the hardest thing is each layer being based on and affected by the upper layer or under layer, even cross layers. A general $3^{rd}$ platform application requires: Real timely and elastically response to the request change, including scale-out when the request rapidly increasing, and scale-in at once request storm over; Capabilities requirement change according to the business evolution. For example, a small sales system requires I/O on database; but when the requests number increase, it is necessary to add more load balance layer, cache layer, and more calculation to promote the right products to potential customers, the application turns to CPU intensive type.

Figure 1:
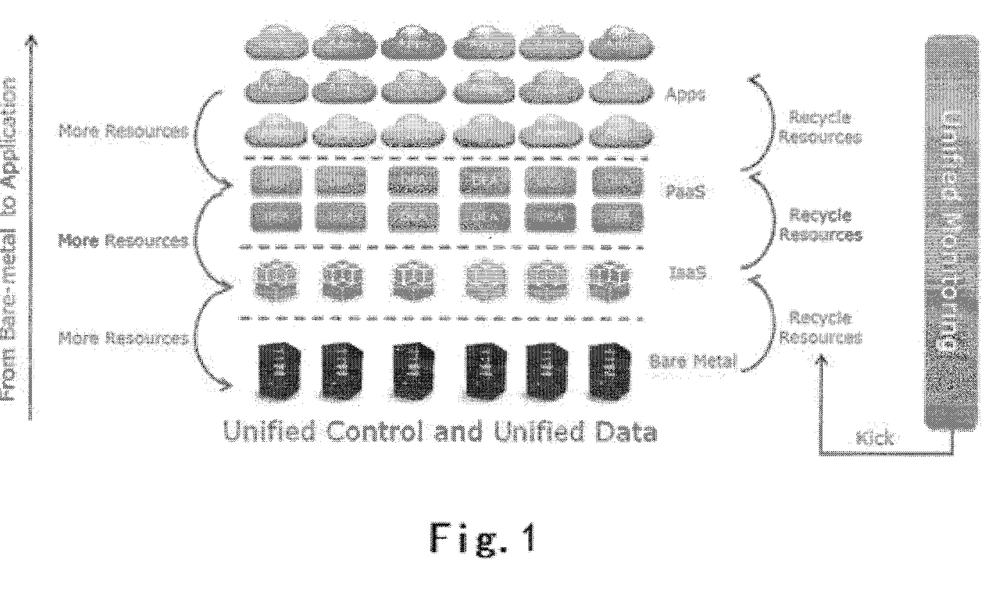
FIG. 1 schematically illustrates a diagram of an application environment according to an embodiment of the present invention.

FIG. 1 schematically illustrates a diagram of an application environment according to an embodiment of the present invention. As shown in FIG. 1, the data center having a multi-layer architecture comprises, from bottom to top, a bare-metal layer, an Infrastructure as a Service layer, a Platform as s Service layer and an application layer. As described above, the resource change is a chain rather than just happen inside one layer. In general, as indicated by arcuate arrows in FIG. 1, resource allocation is usually requested from an upper layer to a lower layer; oppositely, resource reclaim process usually happen from a lower layer to an upper layer.

Considering a typical case, in a diverse infrastructures data center, administrators install OpenStack as the IaaS, while Cloud Foundry as the PaaS upon OpenStack, then the enterprise applications are running in the PaaS. Suppose one day, the requests of one of the applications increasing rapidly, the metering of application asks for extension to meet the expected requests; then Cloud Foundry automatically scales the application out as adding more instances; but in a time, the Droplet Execute Proxy (DEA), which manages the lifecycle of application instances running in it, get the bottleneck, then it asks the IaaS layer, which is OpenStack, to create more virtual machines and deploy more DEA components into them; the virtual machines are running in compute nodes, eventually the compute nodes will also meet the limitation, and request to scale out, then ask the bare-metal layer to provision more servers and configure them as OpenStack compute nodes.

The reclaim process will be reverse: the unified monitoring service can find the spare resources, and kick start the reclaim process. The idle status will be found from the bare-metal layer and the resources allocated can be merged. Then, the OpenStack is requested to migrate the workload and eliminate some compute nodes. The OpenStack notifies the Cloud Foundry to remove DEAs in these affected compute nodes, and then the Cloud Foundry asks applications perform the migration or kill the idle instances.

All these need a global and unified orchestration of cross-layer resources. Such orchestration has the following features. Firstly, it contains the full status of all layers in data center. Specifically, it includes the data of both physical and virtual machines, and exposing status as a query service and accessible by an external system. Secondly, it acts as a single control plane for all layers in data center, specifically, central control for resource reclamation and allocation; each layer can request resources, but the decision made by a central controller (namely, orchestrator) according to overall consideration based on full status of all layers in data center.

An embodiment of the present invention proposes a solution to handle the cross-layer resources in a declarative way. The foundation of the solution is the unified control and unified data.

Figure 2:
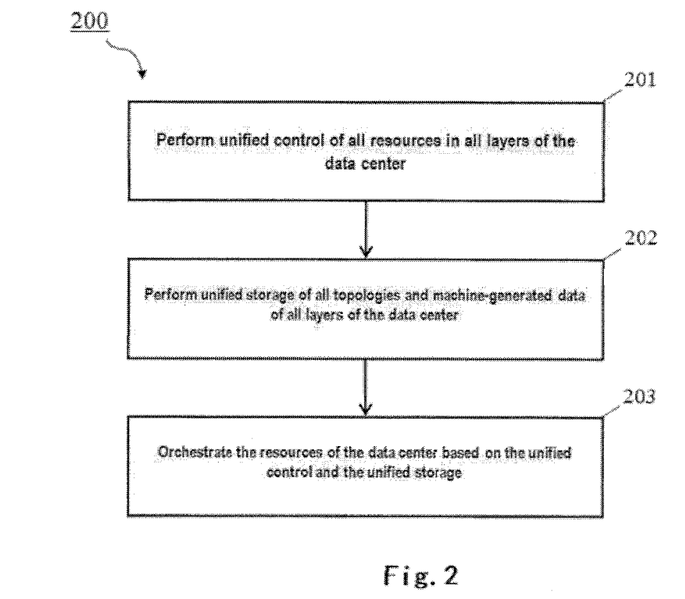
FIG. 2 schematically illustrates a method for performing cross-layer orchestration of resources in a data center having a multi-layer architecture according to an embodiment of the present invention.

FIG. 2 schematically illustrates a method 200 for performing cross-layer orchestration of resources in a data center having a multi-layer architecture according to an embodiment of the present invention. According to an embodiment of the present invention, the data center having a multi-layer architecture for implementing the method 200 at least comprises: a bare-metal layer, an Infrastructure as a Service layer, a Platform as s Service layer and an application layer. Specific steps of the method 200 will be described below with reference to FIG. 2.

After start, the method 200 proceeds to step 201. In step 201, unified control is performed for all resources in all layers of the data center. According to an embodiment of the present invention, performing unified control of all resources in all layers of the data center may comprise: forming a single control plane for all layers of the data center. Therefore, in this way, unified control may be performed for all resources in all layers of the data center in the single control plane. According to an embodiment of the present invention, performing unified control of all resources in all layers of the data center may comprise: performing unified control of allocation and reclaim of all resources of all layers so as to implement unified control of all resources in all layers of the data center.

Then, the method 200 proceeds to step 202. In step 202, unified storage is performed for all topologies and machine-generated data of all layers of the data center. According to an embodiment of the present embodiment, unified storage may be performed for all topologies and machine-generated data of all layers of the data center so as to determine full status of all layers of the data center. Therefore, in this way, it may be realized that resources of all layers of the data center are unifiedly orchestrated according to the full status of all layers of the data center. According to an embodiment of the present invention, the full status may be exposed as a query service and accessible by an external system. Hence, in this manner, full status of all layers of the data center may be conveniently queried and accessed to facilitate unified orchestration of resources in all layers of the data center according to the full status of all layers of the data center. According to an embodiment of the present invention, all machine-generated data in all layers of the data center at least comprises: control plane data as static data or metadata of the whole data center, and data plane data gathered from the running system.

Then, the method 200 proceeds to step 203. In step 203, the resources of the data center are orchestrated based on unified control and unified storage. According to an embodiment of the present invention, orchestrating the resources of the data center based on unified control and unified storage may comprise: in response to requests of one or more layers for resources, performing unified allocation or reclaim for the resources of the data center based on overall consideration of the data center. According to an embodiment of the present invention, orchestrating the resources of the data center based on unified control and unified storage may comprise: finding insufficiency or idleness of resources, and performing unified allocation and reclaim for the resources of the data center based on overall consideration of the data center. Those skilled in the art may understand that allocation and reclaim of the resources is only a specific example of resource orchestration, orchestration of the resources may further comprise other operations on resources such as resource addition and resource deletion or the like. The present invention does not limit specific operations of orchestrating resources. According to an embodiment of the present invention, all resources of all layers at least comprise: hardware resources in the bare-metal layer; virtual machine resources in Infrastructure as a Service layer; resources in the Platform as a Service layer for developing, running and managing applications; or application resources in the application layer.

In a specific implementation of the method 200, according to an embodiment of the present invention, the network implements, through remote procedure call (RPC) via a message bus, unified control of all resources in all layers of the data center and unified storage of all topologies and machine-generated data of all layers of the data center.

Figure 3:
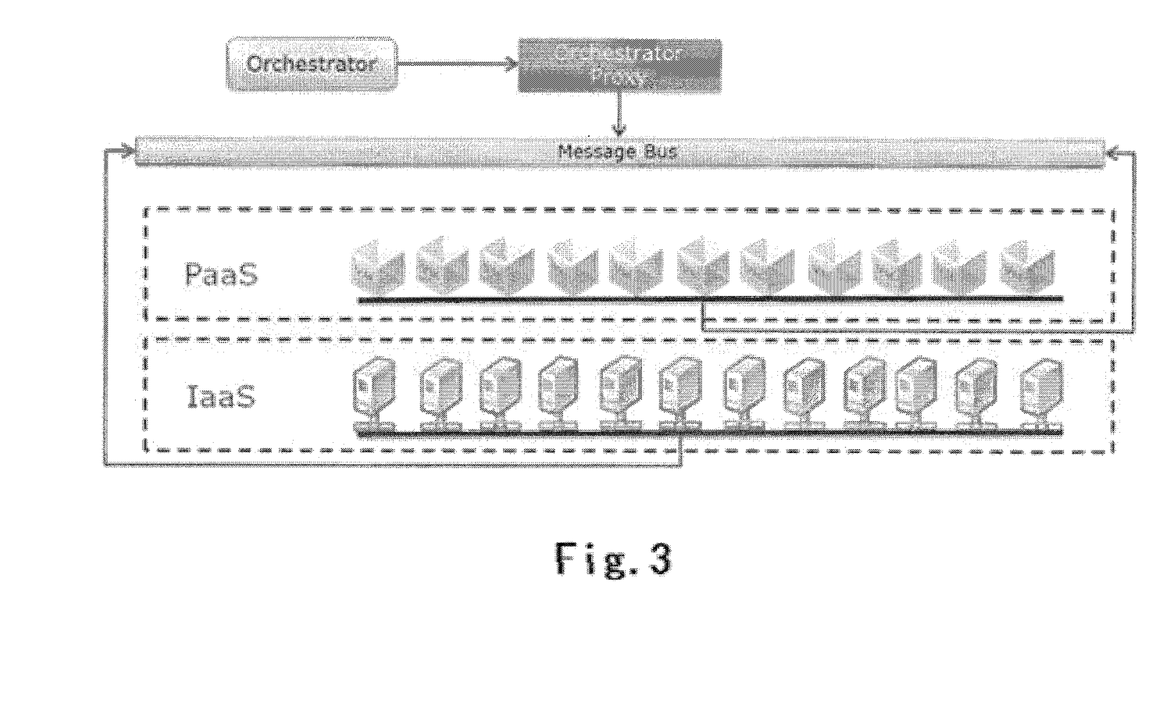
FIG. 3 schematically illustrates a specific implementation of unified control according to an embodiment of the present invention.
Figure 4:
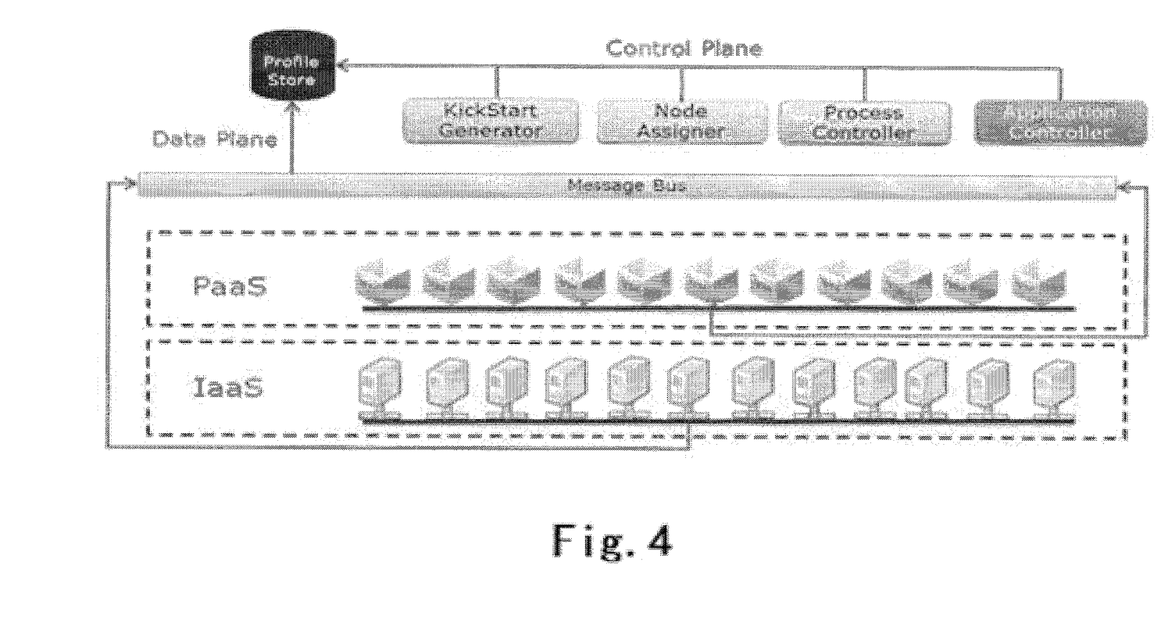
FIG. 4 schematically illustrates a specific implementation of unified data according to an embodiment of the present invention.

FIG. 3 and FIG. 4 schematically illustrate a specific implementation of unified control and a specific implementation of unified data according to an embodiment of the present invention, respectively. For purpose of brevity and clarity, FIG. 3 and FIG. 4 only illustrate two layers PaaS and Iaas as an example of a multi-layer architecture of the data center. Those skilled in the art may appreciate that the present invention is not limited to this, and on the contrary, the present invention may be applied to the data center with any layer.

FIG. 3 is a diagram of specifically performing unified control of physical resources and virtual resources according to an embodiment of the present invention. In FIG. 3, an orchestrator performs unified orchestration for the physical resources and virtual resources of the PaaS layer and Iaas layer in the data center via an orchestrator proxy. The orchestrator proxy may communicate with a message bus, and the message bus may communicate with each physical resource and each virtual resource in the PaaS layer and IaaS layer. In this manner, the orchestrator may send orchestration instructions to the PaaS layer and IaaS layer to implement resource orchestration.

Noticeably, in the present embodiment, as shown in FIG. 3, the central controlling is built upon a message bus to perform the RPC cross virtual machines and physical machines. But RPC via a message bus is only one example way of performing the central management. Web-Service endpoint, share memory call, and other remote communication protocols can also be used to perform central management. In embodiments of the present invention, such a way of linking all resources is emphasized, no matter they are physical or virtual resources, or they are servers or networks or storages in a same pool, then controlled by the unified orchestrator.

FIG. 4 is a diagram of specifically storing unified data of physical resources and virtual resources according to an embodiment of the present invention. In FIG. 4, as in the description of unified control, the RPC via a message bus is only one example used in the present embodiment. What is emphasized here is to store the machine-generated data from all resources to a central store. The machine-generated data here include control plane data and data plane data.

The control plane data refers to the static data or metadata of the whole data center. The control plane data comes from the deployment phase. Because every PaaS and IaaS clusters are deployed and managed by the central orchestrator, all the settings and changes can be logged. FIG. 4 schematically illustrates an embodiment of a deployment and management manner with a Kick-Start generator module, a node assigner module, a process controller module and an application controller module. The control plane data can include but not limit to the following types: PaaS configurations, the admin email, the NTP server and etc.; PaaS deployment information, such as the static IPs and floating IPs of each components; IaaS configurations; IaaS deployment information; Application allocations trace.

Data plane data refers to the dynamic data, which gather from the running system. Applications, PaaS and IaaS will generate a lot of system logs. These logs will be piped up and cleaned, transformed, and loaded to a central store. The data plane data are the important factor to evaluate the QoS.

Figure 5:
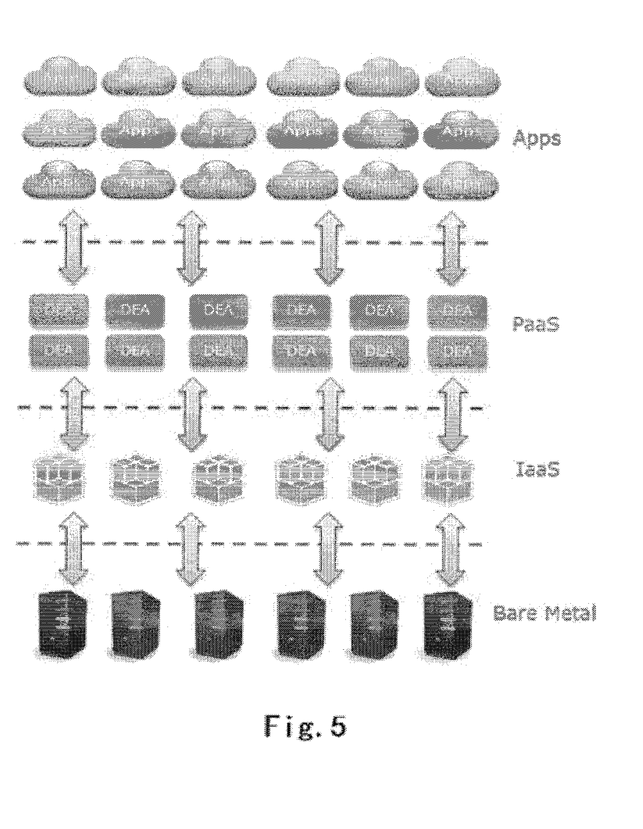
FIG. 5 schematically illustrates quality of service QoS registration and "as a service" model applied to a data center having multi-layer architecture according to an embodiment of the present invention.

FIG. 5 schematically illustrates quality of service QoS registration and "as a service" model applied to a data center having multi-layer architecture according to an embodiment of the present invention. As shown in FIG. 5, each layer of the multiple layers of the data center of the embodiment of the present invention exposes its capabilities out through an interface. In an embodiment of the present invention, the data center stack is composed of a set of "as a Service" model, which means each layer expose its capabilities out through APIs. Specifically, the application (Apps) layer interfaces with the Platform as a Service (PaaS) layer through runtime support for multiple vendors and developers (.NET, Java, Perl, Python, Ruby and etc.) as well as multiple services, the PaaS layer interfaces with the Infrastructure as a Service (Iaas) layer through an API that integrates with VMs, virtual network, block storage and file storage, and the IaaS interfaces with the bare-metal layer through an API to IPMI, PEX, LLDP, SDN, HDL, SNMP and etc.

In addition, according to an embodiment of the present invention, all resources of all layers of the data center may be evaluated and grouped into different SLA groups. In this aspect, according to an embodiment of the present invention, there are two ways to perform the evaluation: manually definition in deployment phase; policies definition according to the data plane data. The resources of each layer will be grouped into different types and QoS, and exposed out as services by different mature tools with a modular design.

Figure 6:
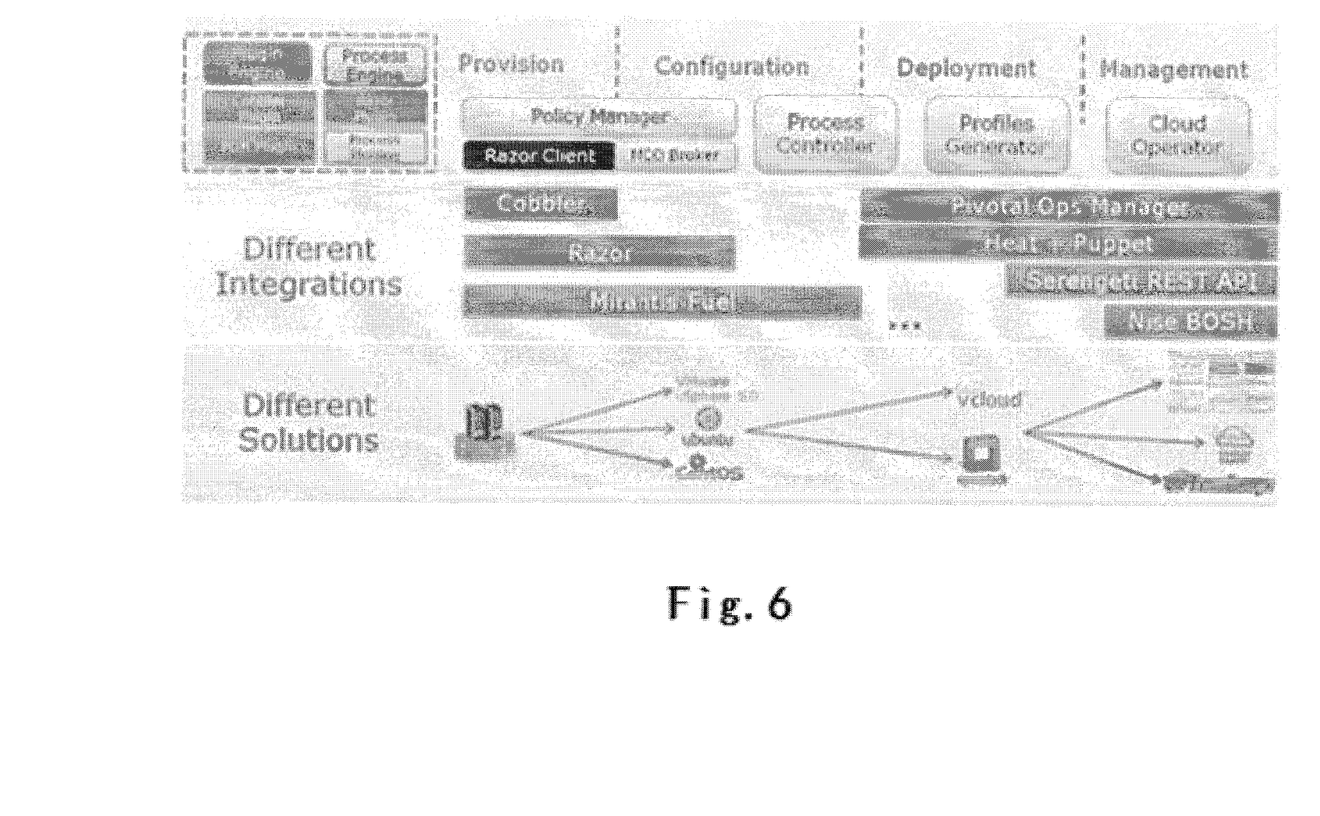
FIG. 6 schematically illustrates a block diagram of a design of the multi-layer data center according to an embodiment of the present invention.

FIG. 6 schematically illustrates a block diagram of a design of the multi-layer data center according to an embodiment of the present invention. As shown in FIG. 6, the design of the data center of the present invention is based on task orientated policies (also referred to as templates or deployment templates). As described above, most existing orchestration tools focus on low-level features exposing, which called "foundation orchestration engine" or "low-level orchestration engine". In embodiments of the present invention, besides the foundation features wrapping from vary existing tools, task-oriented processes are designed. Furthermore, they can be assembled. The processes include, but not limit to, from bare-metal to Operating System: installing CentOS (6, 6.5, 7), installing Ubuntu (10.04, 12.04, 14.04), installing CoreOS clusters, and installing EXSi servers; from Operating System to IaaS: installing vCloud, installing vCenter, and installing OpenStack (Havana, IceHouse); installing and configuring storages: VNX, and ScaleIO Cluster; from IaaS to PaaS: installing Cloud Foundry clusters and installing Hadoop Cluster.

The above processes are grouped into phases, and each of them can be composed. For example, the process in "from bare-metal to Operating System" can continue the deployment by appending the processes in "from Operating System to IaaS", or even cross layer integration may be performed.

The composability mechanism leads to the final data center environment diversity. However, the diversities are logged in the Central Data store, and managed by the Central Control. Embodiments of the present invention provide a unified user interface for the diverse data center architecture and abstract the differences. This is called "Modular Design" in the present invention.

According to an embodiment of the present invention, the solution of the data center is modularized and divided into the following three layers.

A core logic layer: comprising core logic, common facilities and user interfaces. This layer highly abstracts the detail operations, co-ordinates the different pieces of third-party orchestration tools, and provides unified interfaces from bare-metal layer, IaaS layer, PaaS layer to application level. The core logic layer provides a unified orchestration interface for various data center architectures, and specifically comprises provision, configuration, deployment and management, and involves modules such as a policy manager, a Razor client, a MCO broker, a process controller, a profile generator, and a cloud operator, which are exposed out as various plugins.

Third-party orchestration tools layer: as presented above, most existing orchestration tools are low-level orchestration and competent to a specified use case. Embodiments of the present invention are designed to manage from bare-metal layer to application layer and compatible with different solutions, which have to leverage more than one third-party orchestration tools. Embodiments of the present invention catalog the third-party orchestration tools, and apply a plugin-design to each catalog. The plugin-design exposes the unified interfaces out. According to details of the data center, this layer may employ mature and most suitable orchestration tools, for example, existing orchestration tools such as the Cobble, the Razor, the Mirantis Fuel, the Pivotal Ops Manager, the Heat+Puppet, the Serengeti REST API, and the Nise BOSH as shown in FIG. 6.

A layer of different processes: as presented above, the process is task oriented and composable. Different processes may be selected and combined as a plugin, such as the VMware vSphere, the Ubuntu, the CENTOS, the vcloud, the OpenStack, the Cloud Foundry, the Hadoop etc. as shown in FIG. 6.

Figure 7:
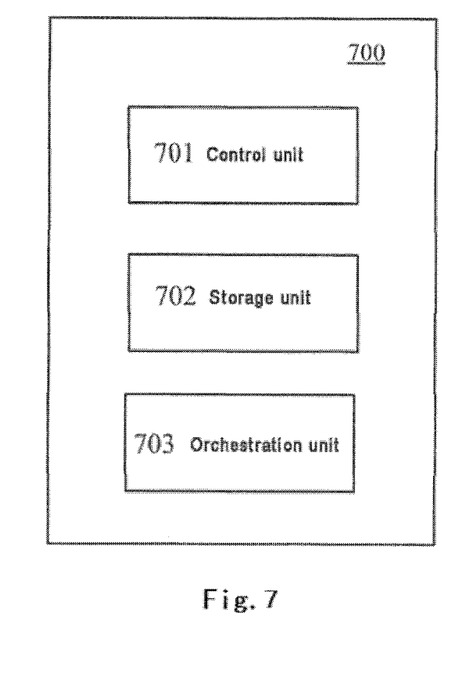
FIG. 7 schematically illustrates a block diagram of an apparatus for performing cross-layer orchestration of resources in a data center having a multi-layer architecture according to an embodiment of the present invention.

FIG. 7 schematically illustrates a block diagram of an apparatus 700 for performing cross-layer orchestration of resources in a data center having a multi-layer architecture according to an embodiment of the present invention. As shown in FIG. 7, the apparatus 700 comprises a control unit 701, a storage unit 702 and an orchestration unit 703.

According to an embodiment of the present invention, the control unit 701 may be configured to perform unified control of all resources in all layers of the data center; the storage unit 702 may be configured to perform unified storage of all topologies and machine-generated data of all layers of the data center; and the orchestration unit 703 may be configured to orchestrate the resources of the data center based on unified control and unified storage.

According to an embodiment of the present invention, the control unit 701 is further configured to form a single control plane for all layers of the data center. According to an embodiment of the present invention, the control unit 701 is further configured to perform unified control of allocation and reclaim of all resources of all layers. According to an embodiment of the present invention, the storage unit 702 performs the unified storage for all topologies and machine-generated data of all layers of the data center, so that the control unit 701 determines full status of all layers of the data center.

According to an embodiment of the present invention, the full status is exposed as a query service and accessible by an external system. According to an embodiment of the present invention, the orchestration unit 703 is further configured to, in response to requests of one or more layers for resources perform unified allocation of the resources of the data center based on overall consideration of the data center. According to an embodiment of the present invention, the orchestration unit 703 is further configured to find insufficiency or idleness of resources, and perform unified allocation or reclaim of the resources of the data center based on overall consideration of the data center. According to an embodiment of the present invention, the control unit 701 and storage unit 702 implement the unified control of all resources in all layers of the data center and the unified storage of all topologies and machine-generated data of all layers of the data center, through a remote procedure call (RPC) via a message bus.

According to an embodiment of the present invention, the multi-layer architecture at least comprises: a bare-metal layer, an Infrastructure as a Service layer, a Platform as s Service layer or an application layer. According to an embodiment of the present invention, all resources of all layers at least comprise: hardware resources in the bare-metal layer; virtual machine resource in the Infrastructure as a Service layer; resources in the Platform as a Service layer for developing, running and managing applications; or application resources in the application layer. According to an embodiment of the present invention, all machine-generated data in all layers of the data center at least comprises: control plane data as static data or meta-data of the whole data center, and data plane data gathered from the running system.

According to an embodiment of the present invention, each layer of the multiple layers of the data center exposes its capabilities out through an interface. According to an embodiment of the present invention, the control unit 701 is further configured to evaluate all resources of all layers of the data center and group them into different service level arrangement (SLA) groups. According to an embodiment of the present invention, evaluating all resources of all layers of the data center and grouping them into different service level arrangement (SLA) groups by the control unit 701 further comprises: manually defining in the deployment phase, or defining policies according to the data plane data.

According to an embodiment of the present invention, the apparatus 700 is based on task-oriented processes. According to an embodiment of the present invention, the task-oriented processes at least comprise: an installation process from a bare-metal layer to an operating system, an installation process from the operation system to an Infrastructure as a Service layer, a process of installing and configuring storages, or an installation process from the Infrastructure as a Service layer to an Platform as a Service layer. According to an embodiment of the present invention, the task-oriented processes can be combined or integrated in a cross-layer manner.

According to an embodiment of the present invention, the storage unit 702 is further configured to store diversity information of the data center architecture, and the control unit 701 is further configured to manage diversity of the data center architecture. According to an embodiment of the present invention, a unified user interface is provided for the diverse data center architecture.

According to an embodiment of the present invention, the apparatus 700 is based on a solution design of multiple layers. According to an embodiment of the present invention, the multiple layers at least comprise: a core logic layer, which is designed to highly abstract detail operations, co-ordinate the different third-party orchestration tools, and provide a unified interface from a bare-metal, an Infrastructure as a Service layer, a Platform as a Service layer to an application level; a third-party orchestration tools layer, which is designed to use various third-party orchestration tools, catalog the third-party orchestration tools, and apply a plugin-design to each catalog; and a layer of different processes, which is designed to select and combine the task-oriented processes as a plugin.

Figure 8:
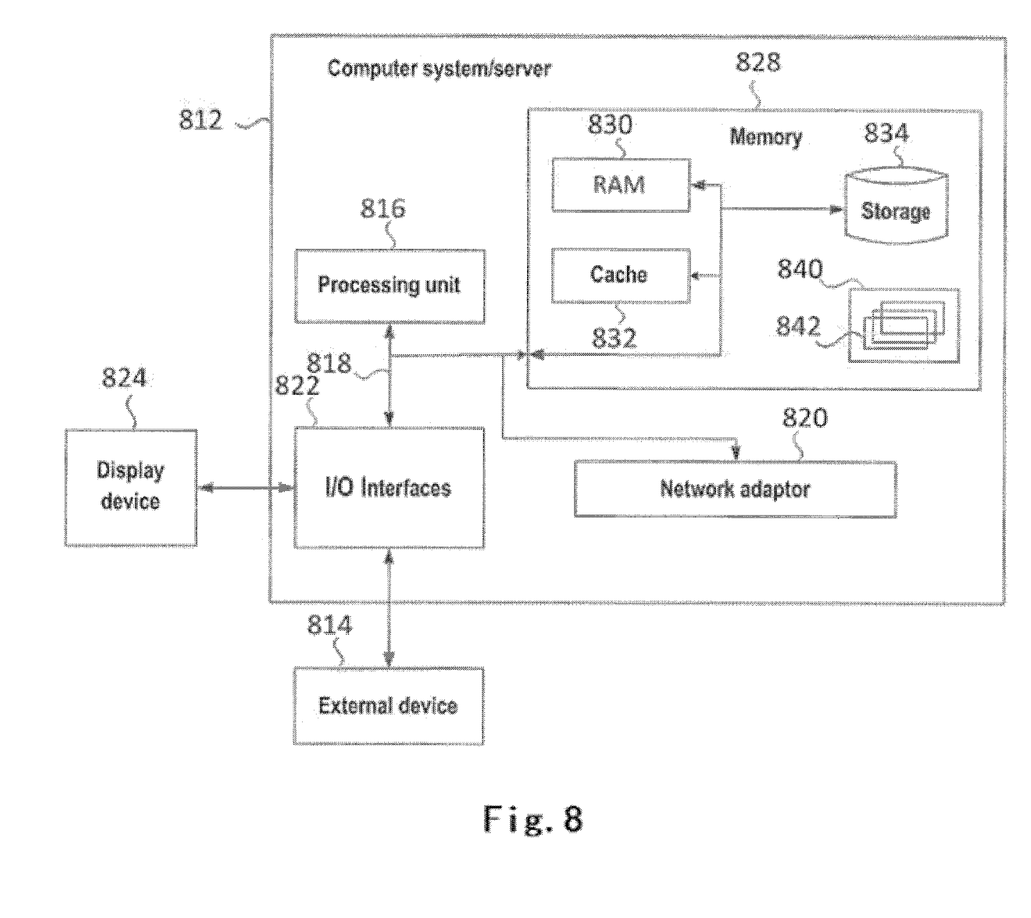
FIG. 8 schematically illustrates a block diagram of an exemplary computer system/server for implementing an embodiment of the present invention.

FIG. 8 schematically illustrates a block diagram of an exemplary computer system/server 812 for implementing an embodiment of the present invention. The computer system/server 812 as shown in FIG. 8 is only one example and not intended to suggest any limitation as to the scope of use or functionality of embodiments of the invention.

As shown in FIG. 8, the computer system/server 812 is represented in in the form of a general-purpose computing device. The components of computer system/server 812 may include, but not limited to, one or more processors or processing units 816, a system memory 828, and a bus 818 that couples various system components including the system memory 828 and the processor 816.

Bus 818 represents one or more of several types of bus structures, including a memory bus or memory controller, a peripheral bus, an accelerated graphics port, and a processor or local bus using any of a variety of bus architectures. By way of example, and not limitation, such architectures include, but not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 812 typically includes a variety of computer system readable media. Such media may be any available media that is accessible by computer system/server 812, including both volatile and non-volatile media, removable and non-removable media.

System memory 828 can include computer system readable media in the form of volatile memory, such as a random access memory (RAM) 830 and/or a cache 832. Computer system/server 812 may further include other removable/non-removable, volatile/non-volatile computer system storage media. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 818 by one or more data media interfaces. Memory 828 may include at least one program product having a set (e.g., at least one) of program modules that are configured to carry out the functions of embodiments of the invention.

Program/utility 840, having a set (at least one) of program modules 842, may be stored in e.g. memory 828. Such program modules 842 may include, but not limited to, an operating system, one or more application programs, other program modules, and program data. Each of these examples or some combination thereof may include an implementation of a networking environment. Program modules 842 generally carry out the functions and/or methods of embodiments of the invention as described herein.

According to the requirements, computer system/server 812 may also communicate with one or more external devices such as a display device 824, a storage device 814, etc.; with one or more devices that enable a user to interact with computer system/server 812; and/or with any devices (e.g., network card, modem, etc.) that enable computer system/server 812 to communicate with one or more other computing devices. Such communication can occur via input/output (I/O) interfaces 822. Still yet, computer system/server 812 can also communicate with one or more networks such as a local area network (LAN), a wide area network (WAN), and/or a public network (e.g., the Internet) via a network adapter 820. As depicted, network adapter 820 communicates with the other components of computer system/server 812 via bus 818. It should be understood that although not shown, other hardware and/or software modules could be used in conjunction with computer system/server 812, including but not limited to: microcode, device drivers, redundant processing units, external disk drive arrays, RAID systems, tape drives, and data archival storage systems, etc.

In the description of the embodiments of the present invention, the term "comprise" and like wording should be understood to be open-ended, i.e., to mean "including but not limited to." The term "based on" should be understood as "at least partially based on." The term "an embodiment" or "the embodiment" should be understood as "at least one embodiment."

It should be appreciated that embodiments of the present invention may be implemented by hardware, software or a combination of the software and combination. The hardware part may be implemented using a dedicated logic; the software part may be stored in the memory, and executed by an appropriate instruction executing system, e.g., a microprocessor or a dedicatedly designed hardware. Those skilled in the art may understand that the above apparatus and method may be implemented using a computer-executable instruction and/or included in processor control codes. For example, such codes are provided on a programmable memory or a data carrier such as optical or electronic signal carrier.

In addition, although operations of the present methods are described in a particular order in the drawings, it does not require or imply that these operations must be performed according to this particular order, or a desired outcome can only be achieved by performing all shown operations. On the contrary, the execution order for the steps as depicted in the flowcharts may be varied. Additionally or alternatively, some steps may be omitted, a plurality of steps may be merged into one step, and/or a step may be divided into a plurality of steps for execution. It should also be appreciated that features and functions of two or more devices according to the present invention may be embodied in one device. On the contrary, features and functions of one device as described above may be further divided into and embodied by a plurality of devices.

Although the present invention has been described with reference to a plurality of embodiments, it should be understood that the present invention is not limited to the disclosed embodiments. The present invention intends to cover various modifications and equivalent arrangements included in the spirit and scope of the appended claims.

What is claimed is:

1. A computer-executable method for performing cross-layer orchestration of resources, using one or more processors and memory, in a data center having a multi-layer architecture, comprising:

performing unified control of all physical and virtual resources in all layers of the data center thereby creating a single control plane;

performing unified storage of all topologies and machine-generated data of all layers of the data center; and orchestrating the resources of the data center based on the unified control and the unified storage;

wherein the multi-layer architecture comprises a bare-metal layer, an Infrastructure as a Service (IaaS) layer, and a Platform as a Service (PaaS) layer, wherein the physical and virtual resources of all resources of all layers of the data center comprise hardware resources in the bare-metal layer, virtual machine resources in the IaaS layer, and resources in the PaaS layer for developing, running and managing one or more applications, wherein the physical and virtual resources of all layers of the data center are unifiedly controlled through a remote procedure call (RPC) via a message bus that communicates with each physical resource and each virtual resource, and wherein the topologies and machine-generated data of all layers of the data center are also unifiedly stored through the remote procedure call (RPC) via the message bus.

2. The method according to claim 1, wherein the performing unified control of all resources in all layers of the data center comprises:

forming a single control plane for all layers of the data center.

3. The method according to claim 1, wherein performing unified control of all resources in all layers of the data center comprises:

performing unified control of allocation and reclaim of all resources of all layers.

4. The method according to claim 1, wherein the unified storage of all topologies and machine-generated data of all layers of the data center is performed so as to determine full status of all layers of the data center.

5. The method according to claim 4, wherein the full status is exposed as a query service and accessible by an external system.

6. The method according to claim 1, wherein orchestrating the resources of the data center based on the unified control and the unified storage comprises:

in response to requests of one or more layers for resources, performing unified allocation and reclaim of the resources of the data center based on overall consideration of the data center.

7. The method according to claim 1, wherein orchestrating the resources of the data center based on the unified control and the unified storage comprises:

finding insufficiency or idleness of resources, and performing unified allocation and reclaim of the resources of the data center based on overall consideration of the data center.

8. A system, comprising:

a data center including a multi-layer architecture; and computer-executable program logic encoded in memory of one or more computers, including one or more processors and memory, enabled to perform cross-layer orchestration of resources in the datacenter, wherein the computer-executable program logic is configured for the execution of:

performing unified control of all physical and virtual resources in all layers of the data center thereby creating a single control plane;

performing unified storage of all topologies and machine-generated data of all layers of the data center; and orchestrating the resources of the data center based on the unified control and the unified storage;

wherein the multi-layer architecture comprises a bare-metal layer, an Infrastructure as a Service (IaaS) layer, and a Platform as a Service (PaaS) layer, wherein the physical and virtual resources of all resources of all layers of the data center comprise hardware resources in the bare-metal layer, virtual machine resources in the IaaS layer, and resources in the PaaS layer for developing, running and managing one or more applications, wherein the physical and virtual resources of all layers of the data center are unifiedly controlled through a remote procedure call (RPC) via a message bus that communicates with each physical resource and each virtual resource, and wherein the topologies and machine-generated data of all layers of the data center are also unifiedly stored through the remote procedure call (RPC) via the message bus.

9. The system according to claim 8, wherein the performing unified control of all resources in all layers of the data center comprises:

forming a single control plane for all layers of the data center.

10. The system according to claim 8, wherein performing unified control of all resources in all layers of the data center comprises:

performing unified control of allocation and reclaim of all resources of all layers.

11. The system according to claim 8, wherein the unified storage of all topologies and machine-generated data of all layers of the data center is performed so as to determine full status of all layers of the data center.

12. The system according to claim 11, wherein the full status is exposed as a query service and accessible by an external system.

13. The system according to claim 8, wherein orchestrating the resources of the data center based on the unified control and the unified storage comprises:

in response to requests of one or more layers for resources, performing unified allocation and reclaim of the resources of the data center based on overall consideration of the data center.

14. The system according to claim 8, wherein orchestrating the resources of the data center based on the unified control and the unified storage comprises:

finding insufficiency or idleness of resources, and performing unified allocation and reclaim of the resources of the data center based on overall consideration of the data center.

15. A computer program product for performing cross-layer orchestration of resources in a data center having a multi-layer architecture, comprising:
- a non-transitory computer readable medium encoded with computer-executable code, the code configured, using one or more processors and memory, to enable the execution of:
  - performing unified control of all physical and virtual resources in all layers of the data center thereby creating a single control plane;
  - performing unified storage of all topologies and machine-generated data of all layers of the data center; and
  - orchestrating the resources of the data center based on the unified control and the unified storage;
  - wherein the multi-layer architecture comprises a bare-metal layer, an Infrastructure as a Service (IaaS) layer, and a Platform as a Service (PaaS) layer, wherein the physical and virtual resources of all resources of all layers of the data center comprise hardware resources in the bare-metal layer, virtual machine resources in the IaaS layer, and resources in the PaaS layer for developing, running and managing one or more applications, wherein the physical and virtual resources of all layers of the data center are unifiedly controlled through a remote procedure call (RPC) via a message bus that communicates with each physical resource and each virtual resource, and wherein the topologies and machine-generated data of all layers of the data center are also unifiedly stored through the remote procedure call (RPC) via the message bus.

16. The computer program product according to claim 15, wherein the performing unified control of all resources in all layers of the data center comprises:
- forming a single control plane for all layers of the data center.

17. The computer program product according to claim 15, wherein performing unified control of all resources in all layers of the data center comprises:
- performing unified control of allocation and reclaim of all resources of all layers.

18. The computer program product according to claim 15, wherein the unified storage of all topologies and machine-generated data of all layers of the data center is performed so as to determine full status of all layers of the data center.

19. The computer program product according to claim 18, wherein the full status is exposed as a query service and accessible by an external system.

20. The computer program product according to claim 15, wherein orchestrating the resources of the data center based on the unified control and the unified storage comprises:
- in response to requests of one or more layers for resources, performing unified allocation and reclaim of the resources of the data center based on overall consideration of the data center.

* * * * *